A. SELOVER.
Fruit-Gatherer.
No. 47,044. Patented Mar. 28, 1865.
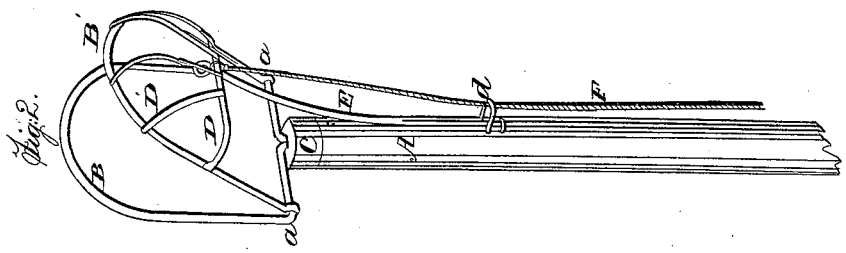
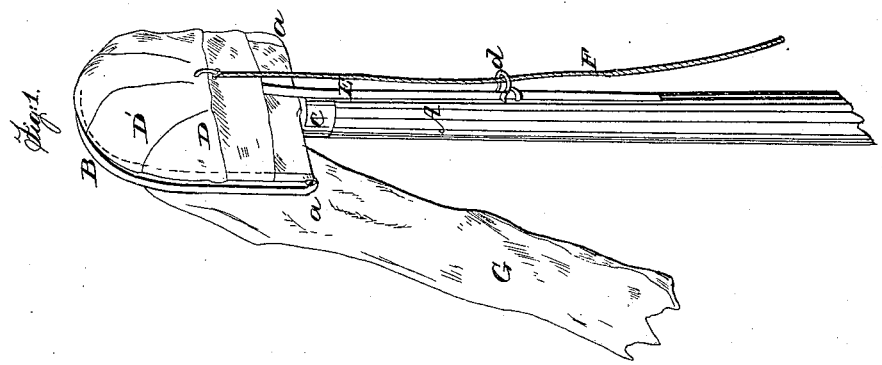
Witnesses:
Inventor:

UNITED STATES PATENT OFFICE.

A. SELOVER, OF BROOKLYN, OHIO.

IMPROVED FRUIT-GATHERER.

Specification forming part of Letters Patent No. 47,044, dated March 28, 1865.

*To all whom it may concern:*

Be it known that I, A. SELOVER, of Brooklyn, in the county of Cuyahoga and State of Ohio, have invented new and useful Improvements in Fruit-Gatherers; and I do hereby declare that the following is a full and complete description of the construction and operation of the same, reference being had to the accompanying drawings, making part of this specification, in which—

Figure 1 is a perspective view, and Fig. 2 is a perspective view of the frame.

Like letters refer to like parts in both views.

The nature of my invention relates to a fruit-gatherer consisting of a frame-work of iron, brass, or other wire, which frame-work is affixed to the end of a long handle, and thereby extended to different parts of the tree without ascending a ladder, this frame-work being constructed in the form of jaws and operated by means of a spring and cord, and the fruit conveyed into a basket by means of a flexible conductor in the manner hereinafter set forth.

In the accompanying drawings, A represents the handle, which can be of any desired length. To the top or end of this handle is attached a wire frame-work, B B', Fig. 2. That portion of the frame-work shown at B consists of a semicircular hoop extending down at the sides and turning at right angles at the top of the handle, where the two ends of the frame meet, and are again turned at right angles and enter the handle, and are secured by a ferrule, C. That portion of the frame-work shown at B' has a form and size corresponding to the frame B, the ends being bent around B at the angles *a a*, thus forming an articulating joint. The frame B' is provided with ribs D D', which serve to support the covering of the frame. The rib D also serves for an attachment to the spring and cord, hereinafter described.

E represents a spring, which is attached to the handle in any convenient manner. The upper end of the spring is secured to the rib D. The primary action of this spring is to keep the frames B and B' in contact.

F represents a cord, which is also attached to the middle of the rib D, and passes down the handle through a loop, *d*, and by pulling upon the cord F the frame B B' is opened, and by releasing the tension upon the cord the spring E closes the frames B B'. The frame B' is covered with some light and flexible material to prevent the fruit from passing out in a wrong direction.

To the frame B, I attach a flexible conductor, G, made of any strong, light, and flexible material, and having a diameter sufficient to admit the free passage of the fruit to be gathered. The length of this conductor should about equal the handle A, and may terminate in a basket or other vessel in which the fruit is deposited as fast as picked.

The manner of using is as follows: The operator takes a basket upon the arm and places the lower end of the conductor therein; then, raising the handle and by pulling upon the cord, opens the frame B B' and seizes the fruit. Then by gently pulling upon the handle the fruit is separated from the branch and passes down the conductor into the basket without becoming bruised. In this manner fruit that is inaccessible by any of the usual modes of gathering can be collected without injury.

Instead of having the frame-work open with a cord and close by means of a spring, as described, it may be so arranged as to be closed by pulling on the cord and opened by a spring. Either method will answer the same purpose.

What I claim as my improvement, and desire to secure by Letters Patent, is—

A fruit-gatherer constructed and operating as herein set forth.

A. SELOVER.

Witnesses:
 W. H. BURRIDGE,
 JOSEPH ADAMS.